Figure 1:
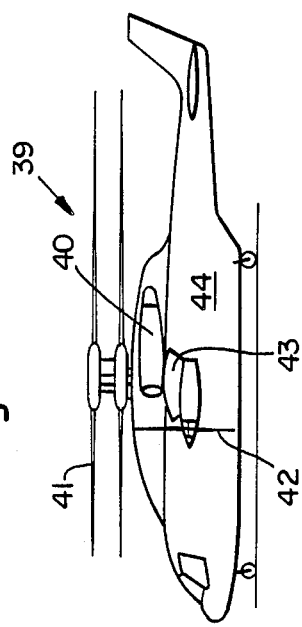

United States Patent [19]

Jupe

[11] Patent Number: 4,783,023

[45] Date of Patent: Nov. 8, 1988

[54] HELICOPTER ROTOR SPEED CHANGING TRANSMISSION

[75] Inventor: Robert J. Jupe, Yeovil, England

[73] Assignee: Westland Group plc, Yeovil, England

[21] Appl. No.: 106,775

[22] Filed: Oct. 13, 1987

[30] Foreign Application Priority Data

Oct. 28, 1986 [GB] United Kingdom ............... 8625712

[51] Int. Cl.⁴ .................... B64C 27/14; B64C 27/26
[52] U.S. Cl. ................................. 244/6; 244/17.19; 244/60; 74/665 L
[58] Field of Search ............. 244/17.11, 17.19, 17.21, 244/17.23, 60, 6, 7 R, 7 A; 74/665 L, 665 N, 665 R

[56] References Cited

U.S. PATENT DOCUMENTS

| 2,653,778 | 9/1953 | Bennett et al. | 244/6 |
| 3,362,255 | 1/1968 | Rocca et al. | 74/665 L |
| 3,782,223 | 1/1974 | Watson | 74/665 L |
| 4,632,337 | 12/1986 | Moore | 244/60 |

Primary Examiner—Galen Barefoot
Assistant Examiner—Rodney Corl
Attorney, Agent, or Firm—Larson and Taylor

[57] ABSTRACT

A helicopter has two engines adapted to drive a main sustaining rotor and a plurality of auxiliary propulsion means through a transmission system that is selectively operable to vary the relative speeds of rotation of the sustaining rotor and the auxiliary propulsion means depending upon operating conditions.

10 Claims, 4 Drawing Sheets

HIGH SPEED DRIVE PATH -----
LOW SPEED DRIVE PATH -----

HELICOPTER ROTOR SPEED CHANGING TRANSMISSION

This invention relates to helicopters.

A limiting factor in increasing the forward speed of conventional helicopters, in which a main sustaining rotor remains substantially edgewise to the airflow during forward flight, is the requirement to prevent the advancing blade exceeding its critical mach number, and it is recognised that in order to combine this requirement with an efficient hover performance it is desirable to be able to vary the rotational speed of the rotor. Thus, a high rotational speed is required in hover and a lower rotational speed is required in cruise.

A moderate range of rotor rotational speeds can be obtained by allowing the power plant output (usually a free turbine) to run within a range of speeds spanning the optimum design speed. However, the range of obtainable rotor rotational speeds is limited by the need to ensure that the inevitable loss of engine efficiency is not excessive.

It is also recognised in the art that a high speed helicopter will require an auxiliary propulsion means such as a propeller or fan in order to supplement the propulsive capability of the main sustaining rotor which reduces in efficiency with increasing forward speed. In such an arrangement it has been found that the distribution of power between the main sustaining rotor and the auxiliary propulsion means varies greatly between the requirements of hover and cruise flight, in that in hover the power is required to be directed mainly to the sustaining rotor whereas in cruise it is required to be directed mainly to the auxiliary propulsion means. It follows, therefore, that in installations in which separate engines are provided for driving the sustaining rotor and the propulsion means, the total power capability will be under-employed throughout the speed range of the helicopter. With gas turbines this will result in high fuel consumption from a large and expensive power plant installation.

An alternative arrangement is to shaft drive both the sustaining rotor and the auxiliary propulsion means from the same power plant. This provides for lower fuel consumption from less installed power but, however, problems then arise from the need to reduce the rotational speed of the sustaining rotor with increasing cruise speed. In a simple transmission system it follows that such a speed reduction of the sustaining rotor will be accompanied by a reduction in the speed of the auxiliary propulsion means at the very time that the speed of the latter needs to be increasing. If the gear ratio between the power plant and the auxiliary propulsion means is selected to provide for the higher speed more suited to cruise flight then the auxiliary propulsion means will overspeed during hover, creating excessive noise and using excessive power.

A prior proposal concerned with these problems is disclosed in U.S. patent application No. 2,665,859. In that proposal an aircraft is provided with both fixed and rotary wings and a pair of laterally spaced propellers located on engine nacelles on the fixed wings. A transmission unit is associated with each of the engines and includes a brake band clutch device for selectively controlling the transmission of power to the propeller and two brake band clutch devices associated with two different gear ratios for selectively transmitting power at a selected ratio to the rotary wings.

It is to be noted that in this prior arrangement when the respective brake band clutches are disengaged no power is transmitted so that for instance, during hover, the propellers are stationary. Consequently when it is desired to engage the propellers it is firstly necessary to actuate both brake band clutches simultaneously and secondly, since it is impossible to translate instantly from zero to full speed, a great deal of sliding of the clutch parts will occur resulting in the generation of tremendous heat and consequent heat sink problems. This problem is exacerbated by the fact that there are six brake band clutches in the installation, giving rise to problems in manipulating large numbers of such devices and in achieving required synchronisation of the operation of pairs or groups of these devices.

The requirement to manipulate four brake band clutches during attempts to change the rotor speed could also result in an inability to control the rotor speed whilst changing from one gear ratio to the other.

Accordingly, in one aspect, a helicopter having two power sources for driving a main sustaining rotor and an auxiliary propulsion means includes a transmission system selectively operable to vary the relative speeds of rotation of the sustaining rotor and the auxiliary propulsion means, the transmission system including, for each power source, a layshaft, a first output pinion on each said layshaft connected through a freewheel device to a rotor output gear for driving said main sustaining rotor, a second output pinion on each said layshaft connected through a freewheel device to an auxiliary propulsion output gear for driving said auxiliary propulsion means, and a third output pinion on each said layshaft drivingly connected to a common differential gear having a central output shaft connected through an actuatable freewheel clutch to said rotor output gear.

In a modified form of the invention the central output shaft may be connected through an actuatable freewheel clutch to the auxiliary propulsion output gear, and in a further modified form the central output shaft may be connected through actuatable freewheel clutches to both the rotor output gear and the auxiliary propulsion output gear.

Preferably the gear ratio between said third output pinion and said differential gear is lower than that between said first and second output pinions and the respective rotor and auxiliary propulsion output gears.

The main sustaining rotor may comprise a co-axial rotor and may be driven from said rotor output gear through a planetary gear system.

The auxiliary propulsion means may comprise two propellers driven from said auxiliary propulsion output gear through suitable gearing and drive shafts.

In another aspect the invention provides a helicopter having two engines arranged to drive a main sustaining rotor and auxiliary propulsion means through a transmission system wherein the transmission system includes layshafts driven by the respective engines, each layshaft having a first output gear drivingly connected through a freewheel device to a rotor output gear for driving the sustaining rotor, a second output pinion drivingly connected through a freewheel device to an auxiliary propulsion means output gear for driving said auxiliary propulsion means, and a third output pinion drivingly connected to a common in-line differential gear having a central output shaft connected through actuatable freewheel clutches to the rotor output gear and the auxiliary propulsion means output gear, the gear ratio between the third output pinions and the differential gear being lower than that between the first and second output pinions and the rotor output gear and auxiliary propulsion means output gear respectively.

Figure 2:
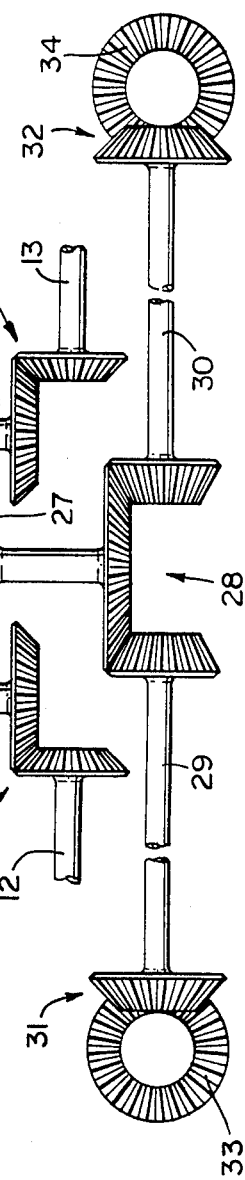
Figure 3:
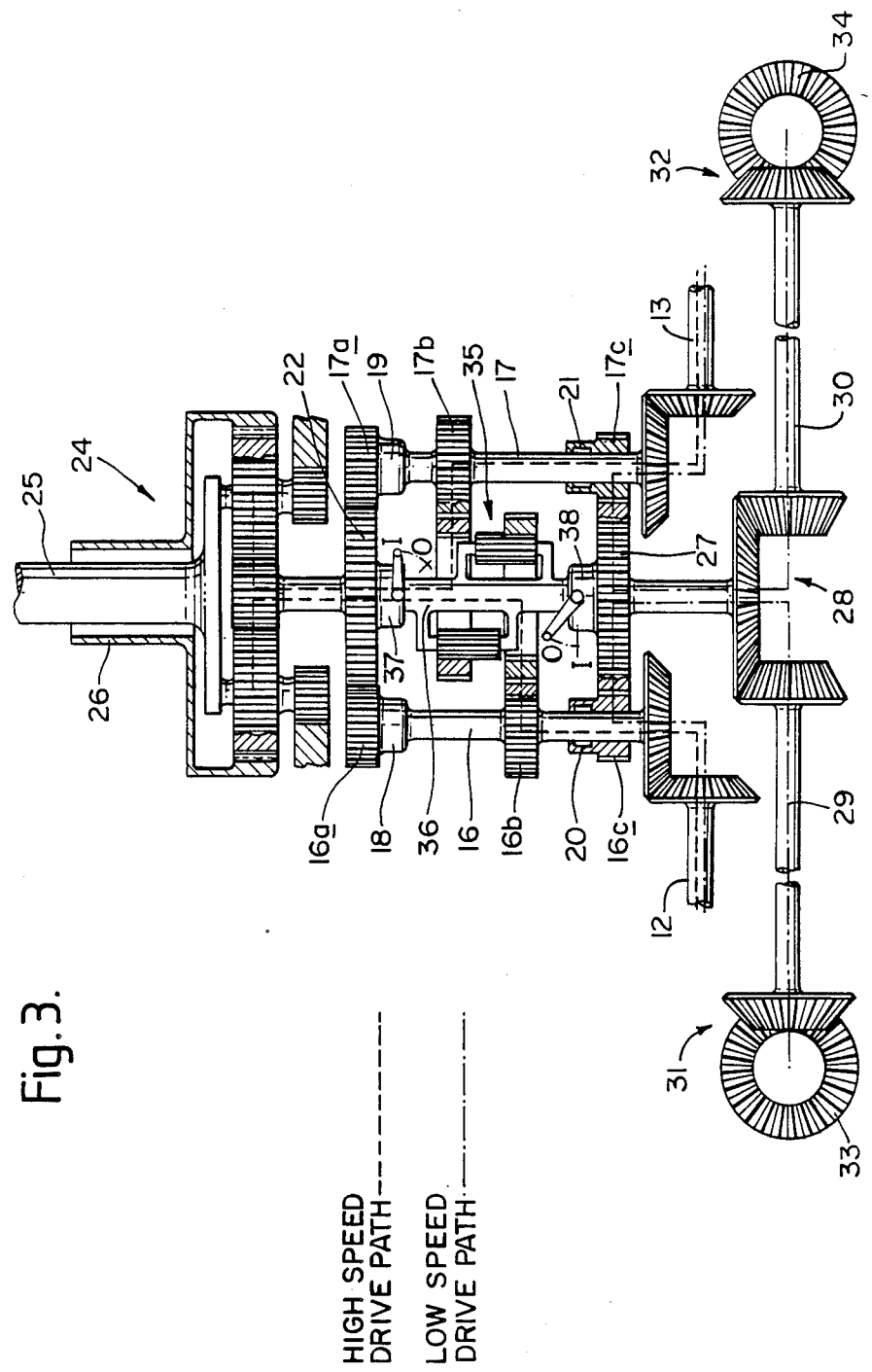
Figure 4:
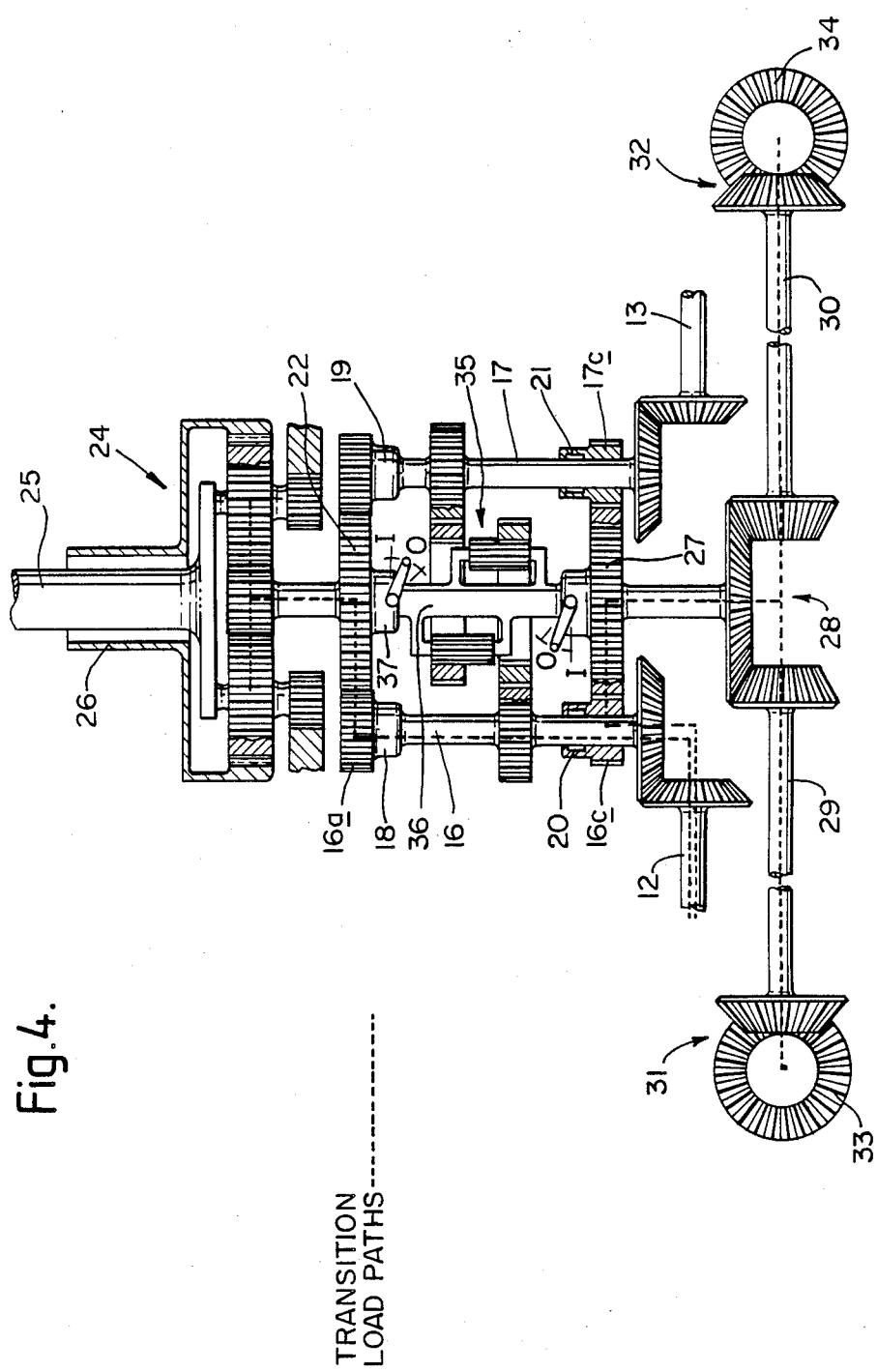
Figure 5:
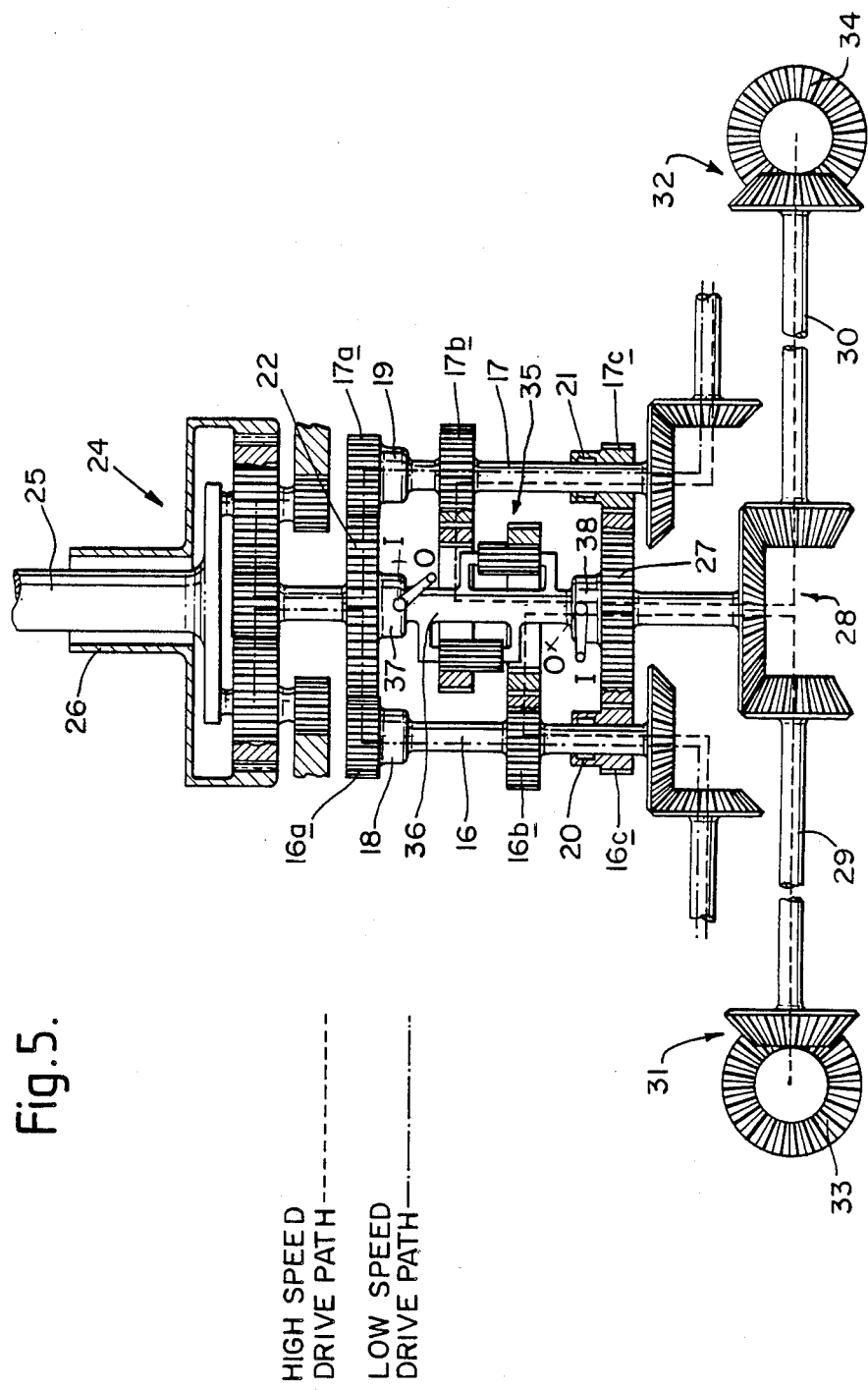

The invention will now be described by way of example only and with reference to the accompanying drawings in which, FIG. 1 is a side elevation of a high speed helicopter constructed in accordance with one embodiment of the invention, FIG. 2 is a fragmentary part sectioned view of a two speed transmission system for the helicopter of FIG. 1, FIG. 3 is a view similar to FIG. 2 and illustrating the load paths through the transmission system during hover and low speed forward flight, FIG. 4 is a view similar to FIG. 2 and illustrating the load paths through the transmission system in a transition phase of operation, and FIG. 5 is a view similar to FIG. 2 and illustrating the load paths through the transmission system during high speed forward flight.

A helicopter 39 (FIG. 1) includes two power sources comprising port and starboard engines 40 (one only being shown) and a transmission system (FIGS. 2 to 5 inclusive) for connecting the engines to drive a main sustaining rotor 41, comprising two contra-rotating co-axial rotors, and two auxiliary propellers 42 (one only being shown) located respectively at the outer ends of stub wings 43 extending outwardly from a fuselage 44.

The transmission system generally indicated at 11 in FIG. 2 includes port and starboard engine input shafts 12 and 13 connected through bevel gear sets 14 and 15 to port and starboard layshafts 16 and 17 respectively. Each layshaft 16 and 17 has a first (upper) output pinion 16a and 17a connected through freewheel clutches 18 and 19, a second (lower) output pinion 16c and 17c connected through freewheel clutches 20 and 21 and a fixed third (central) output pinion 16b and 17b. Freewheel clutches 18, 19, 20 and 21 are adapted to transmit torque from the layshafts 16 and 17 to respective output gears, and to overrun when the speed of rotation of the output gears exceeds that of the respective layshafts 16 and 17.

The first pinions 16a and 17a engage a rotor output gear 22 which drives the sun gear 23 of a planetary gear system generally indicated at 24 adapted to drive the co-axial drive shafts 25 and 26 connected to the main sustaining rotor 41 (FIG. 1). The second pinions 16c and 17c engage an auxiliary propulsor output gear 27 which is connected through bevel gear sets 28, shafts 29 and 30, and further bevel gear sets 31 and 32 to drive port and starboard propulsor drive shafts 33 and 34 respectively connected to the twin auxiliary propellers 42 (FIG. 1).

The third pinions 16b and 17b are staggered axially on the layshafts 16 and 17 to enable them to engage a common centrally positioned in-line differential gear unit 35. Differential gear unit 35 is mounted on a central shaft 36 which provides during certain phases of operation a second drive path to output gear 22 through a lockout or actuatable freewheel clutch 37, and a second drive path to output gear 27 through a further lockout or actuatable freewheel clutch 38.

Actuatable freewheel clutches 37 and 38 are selectively operable between position 'I' in which torque can be transmitted from central shaft 36 to the respective output gears 22 and 27 and position 'O' in which no torque can be transmitted, and it will be understood that clutches 37 and 38 will over-run even in engaged position 'I' should the speed of rotation of the respective output gears 22 and 27 exceed that of central shaft 36. The mode of operation of actuatable clutches 37 and 38 cannot be changed while torque is being transmitted and the main purpose of the in-line differential gear unit 35 is to unload the clutches 37 and 38 during transition phases of operation as described in detail hereinafter.

It will be noted that the third pinions 16b and 17b are larger in diameter than the respective first and second pinions 16a, 17a, 16c and 17c to provide a correspondingly lower gear ratio and therefore a higher output drive speed when connected either to the rotor output gear 22, or the auxiliary propulsor output gear 27.

Operation of a helicopter incorporating the transmission system of this invention will now be described with reference to FIGS. 3, 4 and 5, in which like reference numerals have been used to indicate parts identical to those previously described. In all cases the high speed drive path is indicated by the uniform broken line and the low speed drive path by the chain dot line.

FIG. 3 represents the transmission configuration for take off, landing, hover and low speed forward flight. In this configuration actuatable clutch 38 is at position 'O' and actuatable clutch 37 is at position 'I'.

Torque from input shafts 12 and 13, is transmitted to port and starboard layshafts 16 and 17. Due to the lower gear ratio between third output pinions 16b and 17b, and the inline differential gear unit 35, the high speed drive is transmitted through central shaft 36, actuatable clutch 37, output gear 22 and planetary gear 24, to drive co-axial drive shafts 25 and 26 attached to the main sustaining rotor 41 (FIG. 1).

Due to the higher gear ratios, freewheel clutches 18 and 19 overrun during this phase of operation; however, since actuatable clutch 38 is at position 'O', low speed drive is transmitted through freewheel clutches 20 and 21 to output gear 27, to drive the drive shafts 33 and 34 of the auxiliary propellers 42 (FIG. 1).

Thus, during this phase of operation the main sustaining rotor 41 is driven at high speed to obtain adequate vertical thrust, while the auxiliary propellers 42 are driven at low speed to conserve power consumption.

When it is desired to change from low to high forward speed and vice versa it is necessary to enter a transition phase to enable the mode of operation of actuatable clutches 37 and 38 to be changed.

Considering firstly transition from the hover/low speed operation described with reference to FIG. 3 to a high forward speed operation it is necessary firstly to reduce rotor r.p.m. by re-setting the helicopter rotor speed governing datum. The power from one engine, say the starboard engine connected to input shaft 13, is then reduced to a flight idle setting, and the consequent reduction in speed of the starboard layshaft 17 will automatically disengage it immediately from output gear 27 by overrunning of clutch 21 associated with the second pinion 17c.

This initial reduction in the speed of rotation of starboard layshaft 17 creates a difference in speed between the two input gears 16b, 17b of the in-line differential gear 35. The central shaft 36 of the differential gear 35 is therefore rotated at the mean speed of the two inputs and will reduce correspondingly the speed of rotation of the output gear 22, and therefore the main rotor drive shafts 25 and 26.

The reduction in main rotor speed will be sensed by the helicopter rotor speed governor which will automatically increase the power output from the port engine to maintain datum rotor speed, and this will increase the speed of rotation of port layshaft 16 until it catches up with the speed of rotation of first pinion 16a to engage through clutch 18 with output gear 22. Further increase in speed of layshaft 16 increases the speed differential with layshaft 17 causing actuatable clutch 37 to disengage by overrunning. Clutches 19 and 21 will overrun leaving the drive path to the main sustaining rotor 41 entirely through clutch 18 and the drive path to the auxiliary propellers 42 through clutch 20 as indicated by the dotted lines in FIG. 4.

Thus, at this interim stage of the transition operation, a drive path to the main sustaining rotor and its speed have been maintained, the speed of operation of the port engine and the drive shafts 33 and 34 of the auxiliary propellers 42 has been increased, and both of the actuatable clutches 37 and 38 are automatically unloaded and disengaged as indicated by the intermediate positions indicated in FIG. 4.

Actuatable clutch 38 is now moved to engage mode 'I' and actuatable clutch 37 to lockout mode 'O' (FIG. 5). Power from the starboard engine is now increased to match that of the port engine, and the corresponding increase in the speed of rotation of starboard layshaft 17 increases the speed of rotation of the central shaft 36 of differential gear 35 until it catches up with the speed of rotation of output gear 27 which will engage actuatable clutch 38. A further increase in the speed of rotation of the starboard layshaft 17 will further increase the speed of rotation of output gear 27 and, correspondingly, the auxiliary propellers 42. Due to the different gear ratios, clutches 20 and 21 will overrun leaving the drive path to the propellers 42 entirely through the low gear ratio of third pinions 16b and 17b and actuatable clutch 38, as indicated by the high speed drive path shown in uniform broken line in FIG. 5.

As the speed of rotation of the starboard layshaft 17 reaches that of the port layshaft 16, clutch 19 will engage to enable the starboard engine to contribute its power to drive the main rotor drive shafts 25 and 26 through the low speed drive path indicated by the chain dot line in FIG. 5.

This completes the transition to leave the main sustaining rotor 41 at a low speed, and the auxiliary propellers 42 at a high speed, suitable for high speed forward flight. It will be noted that following this initial transition mode of the described embodiment, the engine free turbines are running at a high speed and such an arrangement permits a further reduction of main rotor speed as forward flying speed increases by progressively resetting the helicopter engine governor datum to reduce free turbine speeds.

Transition from high to low forward speed drive ratios is the reverse of the above. Briefly, as forward speed reduces towards minimum power speed, the main sustaining rotor speed is increased by increasing the engine free turbine speed. The power of one of the engines is then reduced to a flight idle setting which in turn will reduce the speed of rotation of the auxiliary propulsor output gear 27 and unload actuatable clutch 38.

Actuatable clutch 38 is then changed to lockout mode (position 'O') and actuatable clutch 37 is changed to engage mode (position 'I'), and engine power is restored. This engages clutch 37 to revert to the respective drive paths illustrated in FIG. 3.

Selectively reducing the rotor speed governor decreases the engine free turbine speeds to further reduce the speed of auxiliary propulsor output gear 27, and this arrangement permits a further increase in main sustaining rotor speed in the hover mode by resetting the engine governor datum to increase free turbine speeds.

For descriptive purposes the transition procedures have been explained in detail and may appear rather complex; however, in practice it is to be noted that it is only necessary for the pilot to reduce the power from one or other of the engines, select the correct mode of operation of the respective actuatable freewheel clutches 37 and 38 and restore the power from the engine.

In contrast with the prior proposal of U.S. application Ser. No. 2,665,859 the present invention utilises a single transmission unit for controlling the relative speeds of a main sustaining rotor and auxiliary propulsion means from power derived from two engines rather than a transmission unit associated with each engine. This results in a much lighter, simpler system since it requires operation of two devices only to effect speed changes compared to the six devices of the prior proposal. Furthermore, operationally, the use of actuatable freewheel type clutches in the present invention is advantageous firstly since engagement occurs automatically at synchronous speeds with none of the tremendous heat generation of the prior proposal and, secondly, since transition can be accomplished without the requirement to physically disconnect the drive, control over the relative speeds of the sustaining rotor and the auxiliary propulsion means is retained at all times.

Whilst one embodiment of the invention has been described and illustrated it will be apparent that many modifications may be made without departing from the scope of the invention as defined in the appended claims. For example, in installations requiring a smaller range of available operating speeds between the main sustaining rotor and the auxiliary propulsion means one or other of the lockout freewheel clutches can be omitted so that major speed variation is accomplished individually in either the main sustaining rotor or the auxiliary propulsion means. The invention can be incorporated in a helicopter having a single main sustaining rotor as opposed to the co-axial rotor of the illustrated embodiment although some form of anti-torque means would then be required. Alternatively, the anti-torque force could also be provided by one or both of the propellers 42 due to their lateral location on auxiliary wing structures 43. The auxiliary propulsion means may comprise propulsive fans, and more or less than the two devices of the illustrated embodiment can be provided. Each of the two power sources may comprise more than one engine, the output from the engines of each power source either being combined to drive the respective single input shafts 12 and 13 or driving individual input shafts for engagement respectively with the two layshafts 16 and 17.

What is claimed is:

1. A helicopter having two power sources for driving a main sustaining rotor and auxiliary propulsion means, and a transmission system selectively operable to vary the speed of rotation of the sustaining rotor and the auxiliary propulsion means, the transmission system including, for each power source, a layshaft, a first output pinion on each said layshaft connected through a freewheel device to a rotor output gear for driving said main sustaining rotor, a second output pinion on each said layshaft connected through a freewheel device to an auxiliary propulsion output gear for driving said auxiliary propulsion means, and a third output gear on each said layshaft drivingly connected to a common differential gear having a central output shaft connected through an actuatable freewheel clutch to said rotor output gear.

2. A helicopter as claimed in claim 1, wherein the gear ratio between said third output pinion and said differential gear is lower than that between said first and second output pinions and the respective rotor and auxiliary propulsion output gears.

3. A helicopter as claimed in claim 1, wherein said central output shaft is connected through a further actuatable freewheel clutch to said auxiliary propulsion output gear.

4. A helicopter as claimed in claim 3, wherein the gear ratio between said third output pinion and said differential gear is lower than that between said first and second output pinions and the respective rotor and auxiliary propulsion output gears.

5. A helicopter having two power sources for driving a main sustaining rotor and auxiliary propulsion means, and a transmission system selectively operable to vary the speed of rotation of the sustaining rotor and the auxiliary propulsion means, the transmission system including, for each power source, a layshaft, a first output pinion on each said layshaft connected through a freewheel device to a rotor output gear for driving said main sustaining rotor, a second output pinion on each said layshaft connected through a freewheel device to an auxiliary propulsion output gear for driving said auxiliary propulsion means, and a third output gear on each said layshaft drivingly connected to a common differential gear having a central output shaft connected through an actuatable freewheel clutch to said auxiliary propulsion output gear.

6. A helicopter as claimed in claim 5, wherein the gear ratio between said third output pinion and said differential gear is lower than that between said first and second output pinions and the respective rotor and auxiliary propulsion output gears.

7. A helicopter having two engines arranged to drive a main sustaining rotor and auxiliary propulsion means through a transmission system, the transmission system including layshafts driven by the respective engines, each layshaft having a first output pinion drivingly connected through a freewheel device to a rotor output gear for driving the sustaining rotor, a second output pinion drivingly connected through a freewheel device to an auxiliary propulsion means output gear for driving said auxiliary propulsion means, and a third output pinion drivingly connected to a common in-line differential gear having a central output shaft connected through actuatable freewheel clutches at its ends to the rotor output gear and the auxiliary propulsion means output gear, the gear ratio between the third output pinions and the differential gear being lower than that between the first and second output pinions and the rotor output gear and auxiliary propulsion means output gear respectively.

8. A helicopter as claimed in claim 7, wherein said main sustaining rotor comprises two contra-rotating co-axial rotors.

9. A helicopter as claimed in claim 8, wherein said co-axial rotors are driven from said rotor output gear through a planetary gear system.

10. A helicopter as claimed in claim 7, wherein said auxiliary propulsion means comprise two propellers.

* * * * *